United States Patent
Kerley, Jr. et al.

[15] 3,699,807
[45] Oct. 24, 1972

[54] APPARATUS FOR VIBRATIONAL TESTING OF ARTICLES

[72] Inventors: James J. Kerley, Jr., Cheverly; Norman C. Schaller, Seabrook, both of Md.

[73] Assignee: The United States of America as represented by the Administrator of the National Aeronautics and Space Administration

[22] Filed: Aug. 3, 1971

[21] Appl. No.: 168,650

[52] U.S. Cl. .................................................73/71.6
[51] Int. Cl. ...........................................B06b 1/00
[58] Field of Search ....................73/71.6; 267/150

[56] References Cited

UNITED STATES PATENTS

3,640,124   2/1972   Verga.......................73/71.6

Primary Examiner—James J. Gill
Attorney—R. F. Kempf et al.

[57] ABSTRACT

An apparatus for vibrational testing of manufactured assemblies, components, etc., comprising a vibration table having a generally planar supporting surface for the article being tested, at least a pair of actuating pistons for effecting vibrational movement of the table along a primary axis generally perpendicular to the plane of the supporting surface, at least one further actuating piston for effecting transverse vibration of the table generally in the plane of the supporting surface, and a plurality of pairs of prestressed supporting cables supportingly securing the table to a peripheral stationary frame, the supporting cables being disposed substantially in the plane of the supporting surface and being pre-tensioned to at least ten percent of their ultimate breaking strength. The testing apparatus as described may advantageously be mounted on a testing centrifuge for adding an essentially constant gravitational accelerating force to the vibrational forces acting on the article being tested.

20 Claims, 11 Drawing Figures

INVENTORS
JAMES J. KERLEY, JR.
NORMAN C. SCHALLER

BY

Carl Levy

ATTORNEYS

APPARATUS FOR VIBRATIONAL TESTING OF ARTICLES

ORIGIN OF THE INVENTION

The invention described herein was made by employees of the United States Government and may be manufactured and used by or for the Government for governmental purposes without the payment of any royalties thereon or therefor.

BACKGROUND OF THE INVENTION

This invention relates generally to apparatus for vibrational testing of articles, and in particular to apparatus of the type commonly referred to as shaker tables.

Vibrational testing apparatus are well known in the art, and are generally used for vibrational testing of a great variety of articles, mechanical and electrical assemblies, and the like, to determine the ability of such articles to withstand the effects of vibration under conditions of actual use. Such vibrational testing apparatus generally comprise a supporting surface for the article being tested, which for purposes of convenience is generally more or less planar, means for imparting vibrational movement to the supporting table along one or more primary axes, such as hydraulic pistons or the like, and supporting frame means for the actuating means and for the vibration table, generally including resilient or elastic connecting means between the table and the frame for providing a return force to the table and for delineating the degree of vibration of the system. Additionally, guides and/or other restraints have frequently been utilized to further delineate the degree and direction of vibration.

A primary drawback of such known vibrational testing apparatus has been that the elastic connecting means between the vibrational table and the stationary frame has generally comprised coil springs, comparatively flexible elongated steel rods, or resilient rubber bushings or mountings. Such known elastic connecting means have been found to exhibit an extremely short useful operational life, under heavy cross-coupling due to the repeated flexing and tensioning during each cycle of operation of the apparatus. Thus, for example, in a typical application utilizing resilient rubber bushings or mountings, exhibited a useful operational life of only approximately ten hours before exhibiting total structural fatigue and ensuing breakdown. Clearly, where it is desired to conduct extended vibrational testing, this requires frequent replacement of such bushings or other resilient connecting means, requiring extensive down time of the apparatus to effect such replacement of the bushings, as well as requiring a considerable cost outlay for replacing such bushings per unit of actual operating time. Further, even where extended periods of testing are not a prime object, it should be apparent that the repeated replacement of such elastic bushings, due to their rapid deterioration, represents considerable and significant expenditure for maintenance both in terms of time and expense.

A further drawback of such known vibrational testing apparatus has been that, regardless of the particular actuating means utilized to impart vibration to the table, such as pistons or the like, such actuating means have been required to support all or substantially all of the weight of the table, as well as of the article or device being tested thereon. This has further led to a high rate of deterioration due to wear of the pistons or other actuating means, with the result that these have required comparatively frequent replacement and/or other maintenance.

SUMMARY OF THE INVENTION

With the above background in mind, it is therefore an object of the present invention to provide a vibrational testing apparatus of the general character described, which overcomes the above-mentioned drawbacks of the prior art known devices.

Specifically, it is the primary object of the present invention to provide such a vibrational testing apparatus which utilizes prestressed connecting means for supporting a vibrational table from a peripheral stationary frame, which connecting means exhibits a much longer useful service life than previous known connecting means.

It is a further object of the present invention to provide such a vibrational testing apparatus which features considerably reduced wear of such connecting means, as well as of the actuating means, as compared with prior known devices.

It is yet a further object of the present invention to provide such a vibrational testing apparatus in which a high degree of control is achieved over the modes of vibration of the vibrational table, by using the non-linear predictable characteristics of cable in bending.

These, as well as other objects which will become apparent as the description proceeds, are implemented by the inventive vibrational testing apparatus, characterized by a supporting table having a generally planar supporting surface, upon which the article to be tested is supported, the table being connected to a peripheral stationary frame by means of a plurality of prestressed cables, which cables are disposed substantially in the plane of the table and which are characterized by controlled degrees of stiffness relative to each pertinent axis of the table. Specifically, the cables may be characterized by a stiffness in their horizontal transverse direction, relative to the axial direction of the table, on the order of 500 times that in such axial direction, and at 90° with respect to the horizontal transverse direction, on the order of 70 times that in the axial direction.

BRIEF DESCRIPTION OF THE DRAWINGS

The invention itself will be better understood, and additional objects, features, and advantages thereof will become apparent, from the following detailed description of the preferred embodiment of the inventive vibrational testing apparatus, taken in conjunction with the accompanying drawings in which.

DETAILED DESCRIPTION OF THE INVENTION

Figure 1:
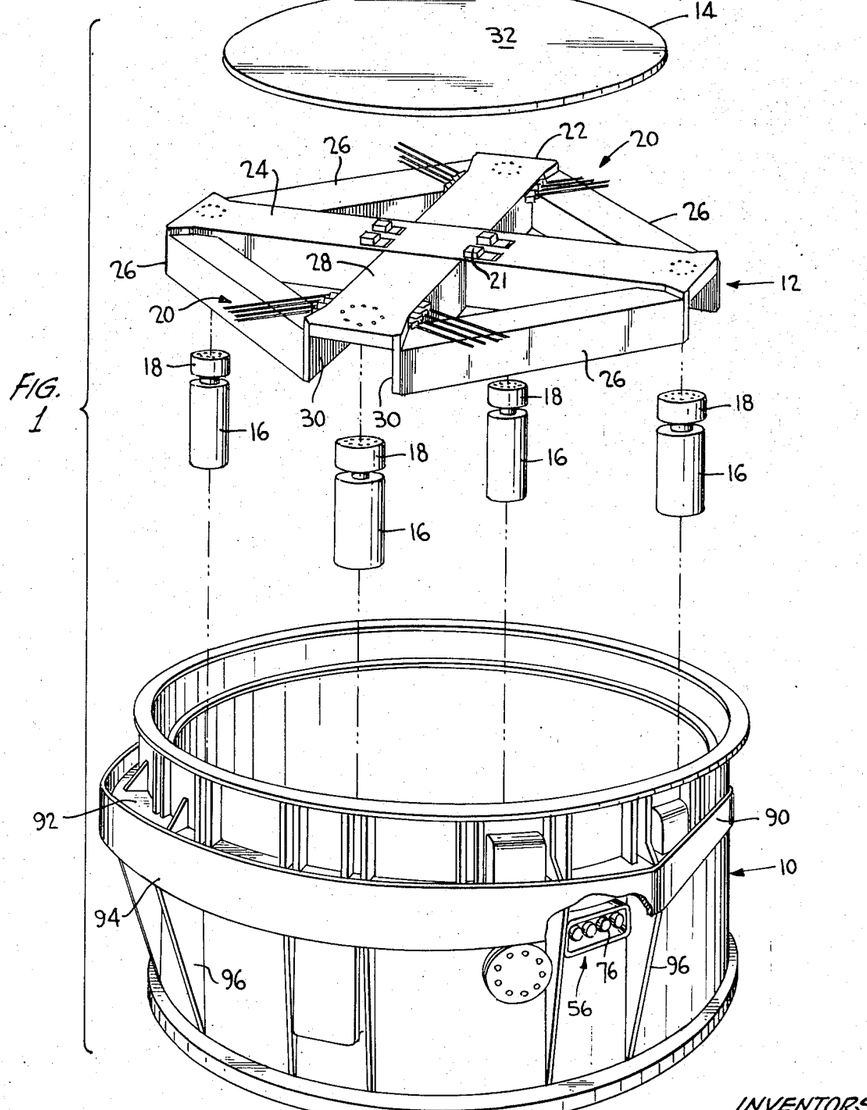
FIG. 1 is an exploded pictorial view of the inventive apparatus, showing the major structural components thereof.
Figures 2, 3, 4, 5:
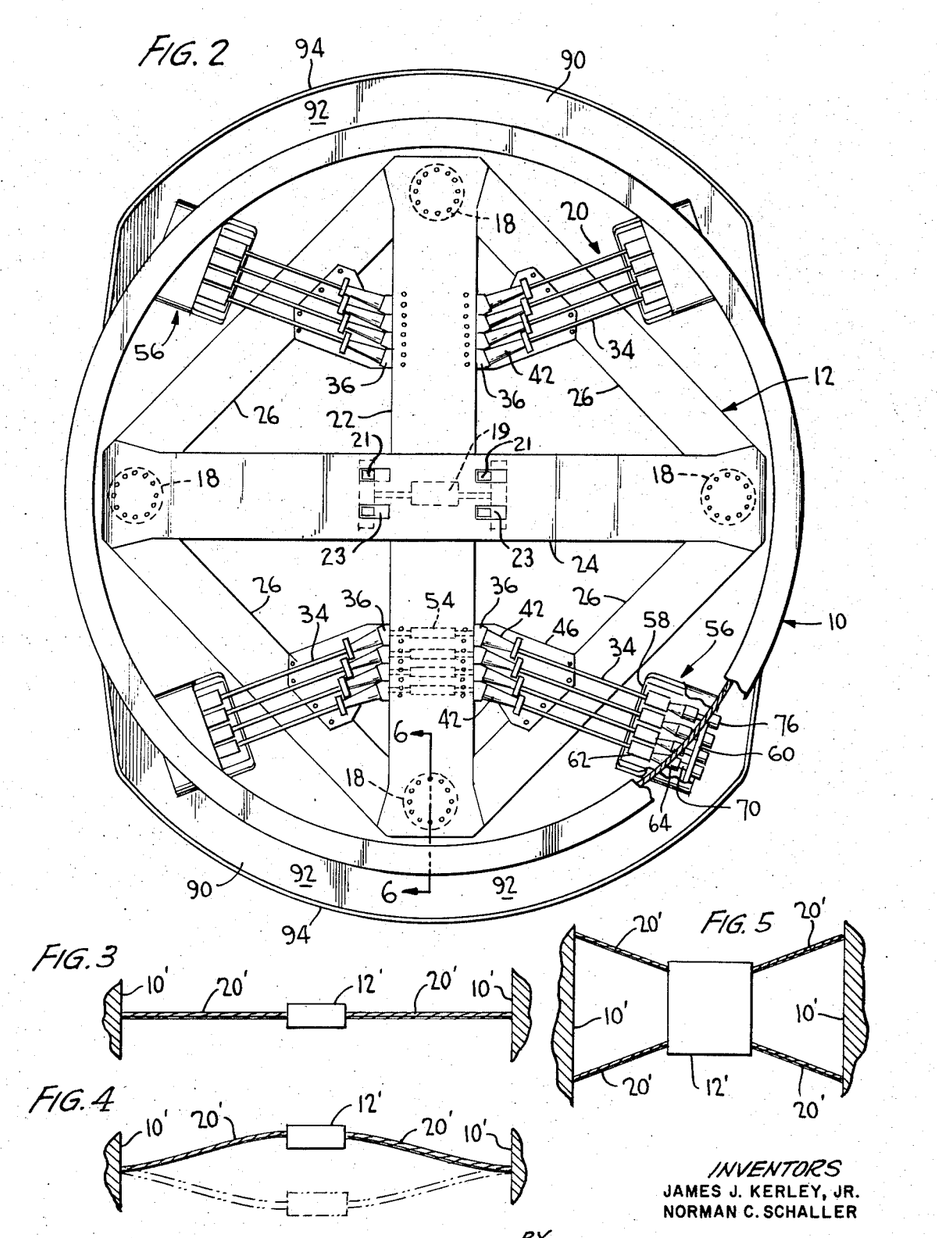
FIG. 2 is a top plan view of the apparatus, with the transversely oscillating and supporting table removed for clarity.
FIGS. 3 and 4 are side elevational views showing the principle of operation of a simplified version of the inventive apparatus.
FIG. 5 is a top plan view of the simplified apparatus shown in FIGS. 3 and 4.

Referring now to the drawings, and initially particularly to FIGS. 1 and 2, there is shown a preferred embodiment of the inventive vibrational testing apparatus for articles, which may find particular utility in testing comparatively large articles such as major components and subassemblies of, for example, aerospace rocket bodies or the like. A base frame member, generally designated by reference numeral 10, serves as a supporting means for the remainder of the structure and, in the preferred illustrated embodiment, comprises a generally cylindrical base frame member whose longitudinal central axis is disposed generally vertically, when the apparatus is to be used as a generally stationary testing apparatus. Table means are provided for supporting one or more articles to be tested, such table means being mounted for limited vibratory movement relative to the base frame means 10 and preferably comprising a lower table frame means, generally designated by reference numeral 12, and an upper table member 14 supported by the lower table frame means 12 and having a generally planar upper table surface for supporting thereon the article to be tested. A plurality of actuating means, each preferably comprising an electro-hydraulic actuating cylinder 16, are secured to the interior of the base frame member 10, in a manner to be described in greater detail at a later point, and each has a respective actuating piston 18 operatively connected with the lower table frame means 12 for effecting vertical and/or rocking vibrational movement thereof, relative to the base frame member 10, the actuating means supporting, in normal operation, substantially the entire weight of the lower table frame means 12, the upper table member 14, and the article or articles being supported thereby. At least one further actuating means, schematically illustrated and designated as 19 (FIG. 2) and advantageously comprising an electro-hydraulic actuating cylinder similar to 16, is provided for effecting transverse vibration of the upper table member 14 in a generally horizontal plane relative to the lower table frame means 12. Such cylinder 19 is connected to the upper table member through a plurality of connector members 21, which connector members extend upwardly through respective elongated guide openings or slots 23 in the lower table frame means 12, and by respective linear hydrostatic bearings (not shown). Further guide means, also not shown, may additionally be provided for guiding the upper table member 14 in its generally linear transverse motion relative to the lower table frame means 12. Finally, a plurality of pre-stressed supporting means are provided, connecting the table means, and particularly the lower table frame means 12, to the base frame member 10. Such prestressed supporting means comprise, in the present invention, a plurality of supporting cable means defining a plurality of supporting cable assemblies generally designated by reference numeral 20, each of such supporting cable assemblies comprising at least one supporting cable member secured at one end thereof to the lower table frame means 12 and at the other end thereof to the base frame member 10, in a manner which will be described more fully at a later point. As a primary feature of this invention, each of the individual supporting cable members is pre-tensioned to between about 10 percent and about 50 percent of its ultimate breaking strength, and is preferably prestressed to about 20 percent of its breaking strength.

The lower table frame means 12, as shown in FIGS. 1 and 2, may advantageously have a generally square-like configuration and preferably comprises first and second elongated transverse frame members 22 and 24, respectively, which are of substantially equal length and cross each other at generally their mid-points at substantially a right angle. Additionally, the lower table frame means 12 includes four elongated connecting frame members 26, which define the respective sides of the square-like configuration of the lower table frame means, and each of which is secured at one end thereof to respective ends of the two elongated transverse frame members 22 and 24, the elongated transverse frame members thereby defining the respective diagonals of the square-like configuration of the lower table frame means 12.

Advantageously, each of the elongated transverse frame members 22 and 24 comprises an elongated beam of inverted generally U-shaped configuration, and including an upper base portion 28 and a pair of depending side portions 30 at either side thereof, for the purpose of providing maximum strength and rigidity to the lower table base frame.

As illustrated in FIG. 1, the upper table member 14 may preferably comprise a comparatively thin and generally planar table member, and in particular such table member preferably comprises a generally circular disk-like table member having a substantially planar upper supporting surface 32 and a comparatively thin cross-section.

Figures 6, 7, 8:
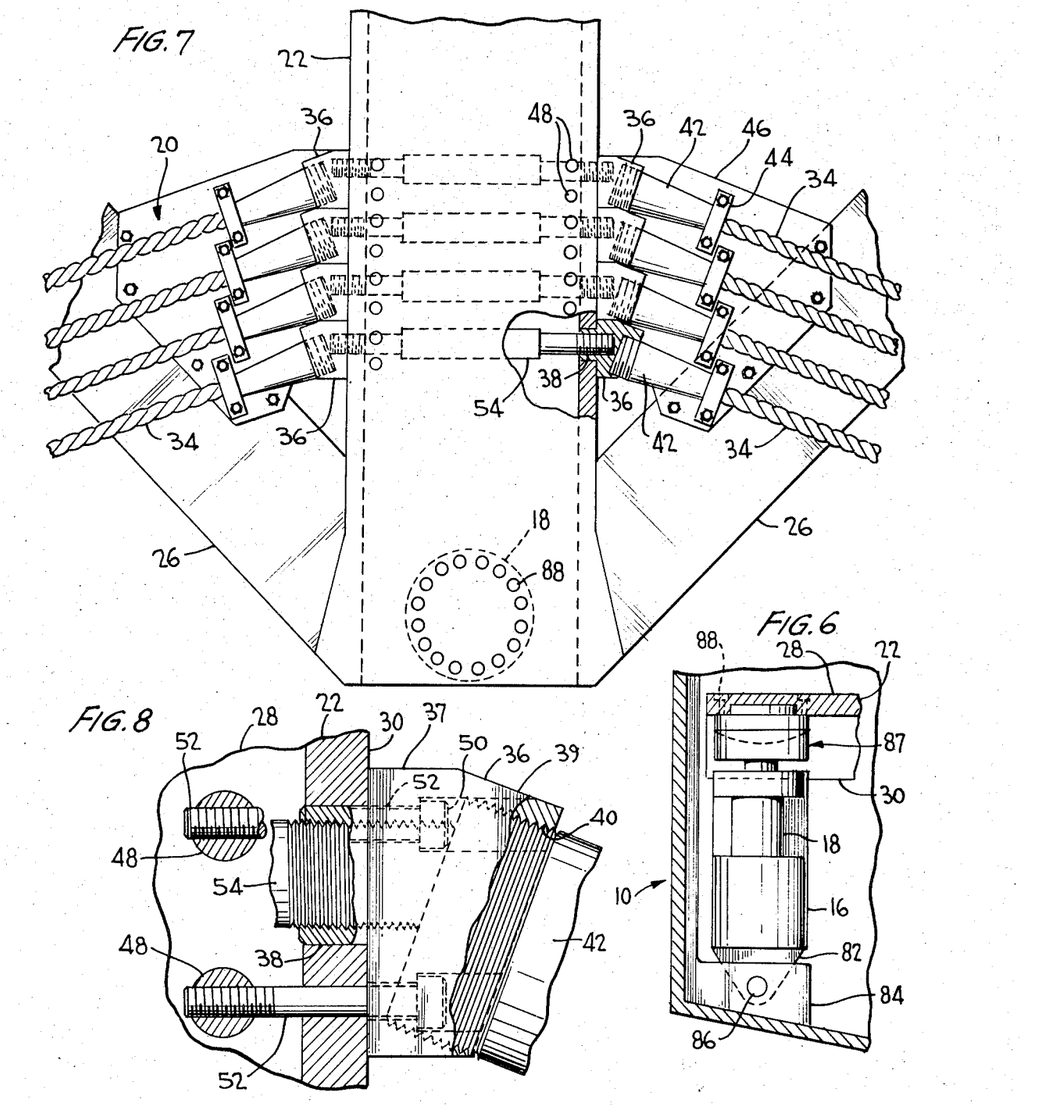
FIG. 6 is a vertical enlarged sectional view, taken along lines 6—6 of FIG. 2, showing details of the mounting for one of the piston actuators.
FIG. 7 is an enlarged top plan view showing details of the connection between the cable assemblies and the sub-frame for the vibration table.
FIG. 8 is a still further enlarged top plan view, partially in section, showing details of a single cable connection to the sub-frame.

As best seen in FIGS. 2 and 7, the four supporting cable assemblies 20 are disposed substantially symmetrically with respect to the table means, and particularly with respect to the lower table frame means 12, and as shown in FIG. 1, such supporting cable assemblies are all disposed in a plane substantially parallel to the plane of the upper supporting table surface 32 of upper table member 14. The supporting cable assemblies 20 are arranged in two pairs of such supporting cable assemblies, the supporting cable assemblies of each such pair being secured to opposite sides of the first elongated transverse frame member 22 generally adjacent each respective opposite end thereof, and extend outwardly and are secured at their opposite ends to the base frame member 10 at opposite sides of such first elongated transverse frame member 22. While the supporting cable assemblies 20 may extend generally perpendicularly to the first elongated transverse frame member 22, preferably they are disposed angularly with respect thereto, in a generally horizontal plane, and in particular, they are preferably disposed at an angle of about 70° with respect to the longitudinal direction of such first elongated transverse frame member, as illustrated. In this manner, by adjusting the tension on the individual supporting cable assemblies, in a manner to be described at a later point, and hence the degree of stiffness of such supporting cable assemblies, the degree of vibration of a cable means, and hence of the article or articles being supported thereby, can be readily controlled in a precise manner. As shown in FIG. 2, for example, each of the respective pairs of supporting cable assemblies 20 angles outwardly and towards its respective end of the first elongated transverse frame member 22; i.e., the pair of supporting cable assemblies 20 shown at the top of FIG. 2 angle outwardly and towards the top of this figure, whereas the pair of supporting cable assemblies shown at the bottom of the figure angle outwardly and downwardly in the figure.

As has been previously mentioned, each of the individual supporting cable assemblies 20 comprises at least one elongated prestressed supporting cable member, and preferably comprises a plurality of such supporting cable members. In the preferred embodiment of the invention as illustrated, each of the supporting cable assemblies 20 comprises four of such individual supporting cable members 34, all of the supporting cable members 34 in each respective supporting cable assembly 20 being disposed substantially parallel to each other, as illustrated, and being secured at one end thereof of to the first elongated transverse frame member, and at the other end thereof to the base frame member 10, to thereby support the table means.

Referring now to FIGS. 2, 7 and 8, it will be seen that each respective pair of supporting cable assemblies 20, for example, the pair of such supporting cable assemblies shown at the bottom of FIG. 2 and in greater detail in FIG. 7, includes a plurality of anchor block members 36 corresponding in number of individual supporting cable members 34 in the respective pair of supporting cable assemblies, eight of such anchor block members being provided for each such pair of supporting cable assemblies in this example. Each of the anchor block members 36 has a first portion 37 which extends substantially perpendicular to the longitudinal section of the first elongated transverse frame member 22 and includes, as best seen in FIG. 8, a reduced-diameter portion 38 which fits into a suitable bore through the respective depending side portion 30 of the transverse frame member 22, and a second portion 39 which is angularly offset with respect to the first portion 37 at an angle of approximately 20° with respect thereto, and which angularly offset second portion includes an internally threaded bore 40. A cable connector member 42, having an externally threaded portion on its end, is threadedly received within the internally threaded bore 40, and has secured therein an end of one of the respective supporting cable members 34. Advantageously, each cable connector member 42 may be hollow and generally frusto-conical in configuration, having its larger diameter end threaded into the internally threaded bore 40 of the anchor block member 36, and the aforementioned end of the supporting cable 34 inserted into the cable connector member 42 for a substantial portion of its length. The cable connector member 42 may then be filled with molten zinc or similar material, which is then allowed to solidify about the aforementioned end of the supporting cable member, to thereby securely anchor the supporting cable member 34 within the cable connector member 42.

While the cable connector members 42 may be connected to the lower table frame means 12 merely through the use of the anchor block members 36 as just described, preferably there are additionally provided hold-down members 44 which respectively secure each of the cable connector members 42 of each supporting cable assembly to a supporting bracket member 46, such supporting bracket member 46 in turn being rigidly secured to the adjacent elongated connecting frame member 26, and, if desired, additionally to the first elongated transverse frame member 22.

Preferably, in order to construct the inventive device with as great a strength as possible and yet providing a minimum weight for the table means, in order to reduce the inertia of such table means, the major structural components of the table means, and particularly at least the first and second elongated transverse frame members 22 and 24, respectively, are fabricated of magnesium or a similar light-weight metal. However, since each of the individual supporting cable members 34 may be subjected to a tension of, for example, 30,000 lbs., the use of magnesium as a material for the elongated transverse frame members 22 and 24 would render such elongated transverse frame members too soft to adequately support and retain the supporting cable assemblies 20, and would be subjected to extreme and rapid creep if such supporting cable assemblies were secured directly to the magnesium elongated transverse frame members. In particular, supporting bolts directly connecting the anchor block members 36 with the magnesium elongated transverse frame member 22 would pull loose from such elongated transverse frame member due to creep upon such elongated transverse frame member resulting from the extreme tensions on such supporting cable assemblies.

Accordingly, rather than directly securing the anchor block members 36 to the elongated transverse frame member 22, a plurality of anchor pin members 48 are provided, of steel or similar hard material, which extend generally vertically through the first elongated transverse frame member 22, i.e., generally perpendicular to both such elongated transverse frame member 22 and to the anchor block member 36. Preferably, two of such anchor pin members 48 are provided for each of the anchor block members 36 and associated cable connector member 42 and supporting cable member 34. A plurality of bolt-receiving bores 50 are provided in each of the anchor block members 36, and are aligned with their axes intersecting the axes of the respective anchor pin members 48. In a preferred arrangement, four of such bolt-receiving bores are provided in each of the anchor block members 36, such bolt-receiving bores being arranged in a more or less square pattern surrounding the cable connector member 42, and two of such bolt-receiving bores 50 being aligned with each of the anchor pin members 48. Into each of these bolt-receiving bores 50 is inserted a securing bolt member 52 which is threaded at its free end, which end is received within a corresponding threaded tapping extending through the respective anchor pin member 48. Thus, the anchor pin members 48, being formed of steel or similar suitable hard material, will securely fasten the anchor block members 36, and associated supporting cable assemblies 20, to the first elongated transverse frame member 22, and will substantially eliminate the possibility of the securing bolt members 52 working loose from the elongated transverse frame member 22.

In order to more securely connect the respective pairs of supporting cable assemblies 20 to each other and to the first elongated transverse frame member 22, there are provided for each such pair of supporting cable assemblies, in the embodiment illustrated, four connecting rod members 54 which extend all the way through the first elongated transverse frame member 22, each of which connecting rod members 54 has at its respective opposite ends externally threaded portions which are threadedly received within corresponding internally threaded portions of reduced-diameter portions 38 of respective ones of the anchor block members 36, as best seen in FIG. 7. Preferably each of the connecting rod members 54 is oppositely threaded at its opposite ends, so that the respective anchor block members 36, during assembly of the apparatus, may readily be threaded onto the corresponding connecting rod member 54 substantially simultaneously, by merely rotating the connecting rod member 54 about its longitudinal axis.

Figure 9:
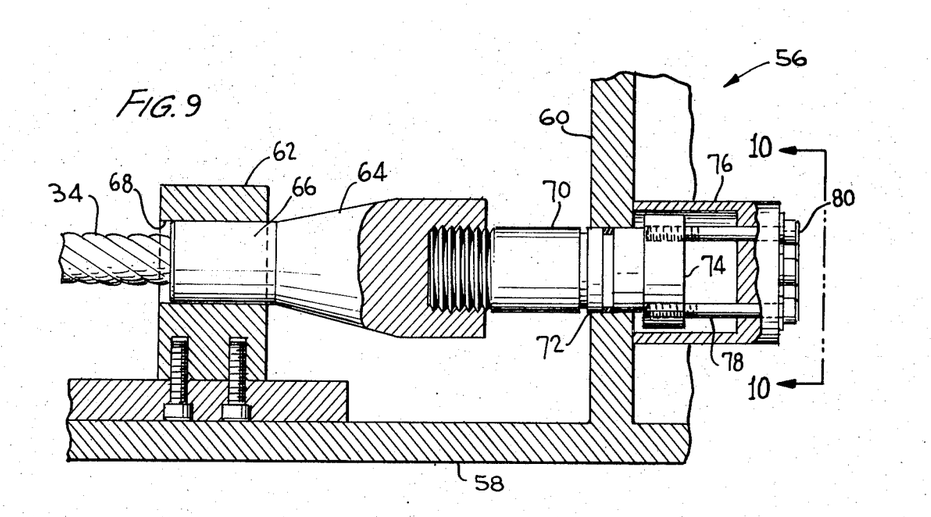
FIG. 9 is a vertical sectional view showing details of a single cable connection to the peripheral stationary frame.

The manner of securing the opposite ends of each of the supporting cable assemblies 20 to the base frame member 10 will now be described with reference to FIGS. 2, 9 and 10. For each of the supporting cable assemblies 20, there is provided a securing means designated generally by reference numeral 56, which serves both to secure the outer ends of each of the individual supporting cable members 34 to the base frame member 10, and to provide means for adjusting the tension on each of such individual supporting cable members 34. Such securing means 56 includes a base plate member 58 which is secured to and extends inwardly from an upright wall member 60, forming a part of the base frame member 10, such base plate member 58 advantageously being formed integrally with the upright wall member 60, as shown in FIG. 9. A first upright bearing member 62 is provided for each of the individual supporting cable members 34, and is secured to the base plate member 58 at a position spaced inwardly from the upright wall member 60. A cable connector member 64 is secured to the outer end of each respective supporting cable member 34, advantageously in the same manner as the previously mentioned cable connector member 42 is secured to the inner end thereof, and includes a generally cylindrical portion 66 which is axially slidably movable within a corresponding generally cylindrical bore 68 which extends through the upright bearing member 62.

Each of the cable connector members 64 is in turn secured to an adjusting member 70, as by being threaded onto one end thereof, which adjusting member 70 extends through a bore 72 in the upright wall member 60 and is axially slidable with respect thereto. The adjusting member 70 further includes at its opposite end, an enlarged diameter headed portion 74 which, in its innermost position corresponding to minimum tension on the cable, bears against the outer surface of the upright wall member 60 and which therefore defines the inner limit of sliding movement of the adjusting member 70 and hence of the cable connector member 64.

A generally cylindrical standoff collar 76 is additionally provided for each of the individual supporting cable members 34, which generally cylindrical standoff collar 76 is hollow for at least a portion of its axial length, at its end adjacent the upstanding wall member 60, which end bears against the outer surface of such upstanding wall member 60. Extending freely through such generally cylindrical standoff collar are a plurality of adjusting bolt members 78, each of which adjusting bolt members is threaded at its inner end and is thereby threadedly received into the enlarged diameter headed portion 74 of the adjusting member 70. Each of the adjusting bolt members 78 further includes an enlarged diameter headed portion 80 which bears against the outer surface of the generally cylindrical standoff collar 76, such that each of the adjusting bolt members 78 is restrained against inward axial movement relative to the generally cylindrical standoff collar 76 and to the upright wall member 60. As shown in FIG. 10, advantageously six of such adjusting bolt members 78 may be provided for each of the adjusting members 70, arranged in a generally hexagonal pattern. It should thus be appreciated that, since the adjusting bolt members 78 are restrained against inward axial movement relative to the generally cylindrical standoff collar 76, and the generally cylindrical standoff collar is in turn restrained against inward axial movement relative to the upstanding wall member 60, while the adjusting member 70 and cable connector member 64 are free for sliding axial movement relative to the upright wall member 60 and upright bearing member 62, respectively, tightening of the adjusting bolt members 78 for a respective adjusting member will draw the adjusting member 70 and its corresponding cable connector member 64 outwardly, relative to the upright wall member 60 and hence to the space frame member 10, and will thereby increase the tension on the respective supporting cable member 34.

As best seen in FIG. 2, preferably all of the individual supporting cable members 34 of a respective supporting cable assembly 20 have different effective lengths between the respective cable connector members 42 and 64 at their respective opposite ends, and therefore each of the supporting cable members 34 of a given supporting cable assembly has a different natural resonant frequency from the other supporting cable members of that supporting cable assembly. In this manner, there is substantially eliminated any possibility of imparting a resonant vibration to the apparatus, which resonant vibration would tend to lead to premature fatigue and breakdown of the apparatus and/or improper test results. In this manner, there is assured a considerably lengthened useful operating life of the apparatus, without the danger of such premature failure of elements thereof. Further, in the event that each of the supporting cable members 34 is comprised of strands of wire of different sizes, such supporting cable members will exhibit high damping and flat resonance characteristics, to further increase the useful life of such members.

As has previously been mentioned briefly in the introduction, the use of such pretensioned supporting cable members renders possible a high degree of control over the modes of vibration of the apparatus, due to the inherent characteristics of such prestressed cables and particularly the manner in which they exhibit different degrees of stiffness along each spatial axis. Thus, for example, in a typical arrangement of the inventive apparatus, as shown in FIG. 1, the supporting cables may be characterized by a stiffness in the horizontal transverse direction, relative to the stiffness in the axial direction of the table, on the order of 500 times that in such axial direction, and a stiffness at 90° with respect to the horizontal transverse direction, on the order of 70 times that in the axial direction. Thus, transverse forces caused by the transverse vibration of the upper table member 14 will be transferred to the base frame member 10, through the prestressed cables, without the establishment of cross-coupling forces with respect to the lower table frame means 12.

Referring now to FIG. 6, there is illustrated the manner in which a typical actuating means for the table means, such actuating means comprising an actuating cylinder 16 and piston 18, is mounted to the base frame member 10 and to the first elongated transverse frame member 22. Each of the actuating cylinders 16 has secured thereto a depending flange member 82 which is connected to an upstanding bearing flange member 84 by any suitable deformable joint means such as a pivot pin member 86, or flexural bolts, the upstanding bearing flange member 84 being rigidly secured to the base frame member 10. It will thus be seen that the actuating cylinder 16 is mounted for limited pivotal movement about an axis transverse to the longitudinal direction of its respective elongated transverse frame member, in this case the lower end of the first elongated transverse frame member 22, as shown in FIGS. 2 and 7. The piston 18 of the actuating cylinder 16, in turn, is pivotally secured to an end of the respective elongated transverse frame member, through a spherical hydrostatic bearing means 87 or the like, by suitable securing means 88. Due to the pivotal mounting of the actuating cylinder 16 relative to the base frame member 10, in the aforementioned vertical longitudinal central plane of the respective elongated transverse frame member 22, the axis of the actuating cylinder 16 and hence of its piston 18 is free to tilt through a limited arc to correspond with tilting or rocking movements of the table means, as, for example, when the actuating cylinders 16 at opposite sides of the table means are being actuated in opposite phase with respect to each other. In this manner, it will be appreciated that considerably reduced wear can be expected to the actuating cylinders 16 and pistons 18, as compared to arrangements where the actuating cylinder is stationary and the piston is forced, due to the aforementioned tilting of the table means, to be skewed relative to the axis of such actuating cylinder.

Preferably, in order to increase the strength and rigidity of the base frame member 10, such base frame member includes, as shown in FIG. 1, at least one annular stiffening ring member 90 secured thereto and extending about a substantial portion of the periphery of the base frame member at generally the level of the table means indicated therein. As shown in FIG. 2, preferably a pair of such stiffening ring members 90 are provided, each extending about a major portion of a respective semi-circumference of the base frame member 10, and each including an outwardly radially extending base portion 92, and a generally axially extending flange portion 94 extending in both axial directions from the outer or free end of the base portion 92. Additionally, as shown in FIG. 1, to provide further stiffening, a plurality of axially extending stiffening web members 96 may be provided, connecting at least one axial side of each of the stiffening ring members 90 with the surface of the base frame member 10. The provision of the stiffening ring members 90 is necessary to control the bending caused by the cables.

In FIGS. 3, 4 and 5 there is illustrated schematically, in a simplified manner, the novel manner in which the inventive supporting cable members both support the table means of the present invention and control the mode of vibration thereof. In FIGS. 3-5, a table member, indicated by reference numeral 12', is shown as supported from oppositely spaced base frame means 10' by a plurality of supporting cable assemblies 20', each of which may comprise a single prestressed supporting cable member, as shown in this simplified version of the invention, or which may each comprise a plurality of cables as in the preferred embodiment previously described. As shown in FIG. 5, four of such supporting cable assemblies 20' are provided, extending outwardly and angularly in the same manner as was previously described with respect to the supporting cable assemblies 20 of the preferred embodiment; it is clear, however, that any number of such supporting cable assemblies could be provided, disposed generally symmetrically to the table member 12', and in fact two oppositely extending individual supporting cable members could serve in some applications. In FIG. 3, there is shown the simplified apparatus at rest; while the supporting cable members 20' are shown as extending essentially in a straight line, it is to be understood, of course, that, even under tension, such supporting cable members would actually exhibit a slight catenary curve due to their own weight and to the weight of the supporting table member 12'. In FIG. 4 there is illustrated the manner in which the supporting cable assemblies 20' flex when the table member 12' is being operated by a suitable actuating means, not shown, which may correspond to the actuating cylinders 16 and pistons 18 previously described, or may be any other suitable actuating means. As shown in FIG. 4, each of the supporting cable assemblies 20' oscillates between an upper extreme position, shown in solid lines, and a lower extreme position, illustrated in dotted lines. In each of these extreme positions, it will be noted that each of the supporting cable assemblies 20', which may be one or more individual supporting cable members, exhibits essentially an ogee configuration over its length, which is a characteristic peculiar to cables and similar elongated members, and which cannot be duplicated by other types of resilient supporting members such as comparatively rigid rods or by resilient rubber bushings or the like. In this manner, the supporting cable assemblies 20', due to the particular manner in which they flex, are able to readily follow the motion of the table member 12', imparted thereto by the actuating means, and are therefore subjected to considerably less shear forces as compared to prior known supporting means, and therefore the supporting cable assemblies 20' and 20 of the present invention exhibit considerably extended useful lifetimes as compared with such prior known supporting means.

As has been previously mentioned, each of the individual supporting cable members 34 of each supporting cable assembly 20 is prestressed to between about 10 percent and about 50 percent of its ultimate breaking point, and preferably to about 20 percent of the ultimate breaking strength of the supporting cable member 34. This is because an unstressed cable supporting such a vibrating member will exhibit both tensional and compressional forces thereupon in a cyclical manner, causing instability and unbalanced loading, as the member being supported vibrates back and forth. By pre-tensioning each of the supporting cable members, it will be seen that compressional forces on such supporting cable member can be reduced. More particularly, it has been found that, by prestressing each of the supporting cable members to at least 10 percent of its breaking strength, compressional forces on such supporting cable member can be eliminated, i.e., neutralized, entirely, with the result that such supporting cable member is subjected purely to tensional forces which vary in degree depending upon the cyclical phase of vibration of the member being supported. By so subjecting each of the supporting cable members 34 to pure tension forces, it has been found that such supporting cable members can now be utilized for a markedly lengthened useful lifetime as compared to systems in which cables are subjected to both tensional and compressional forces. Accordingly, it should be appreciated that this represents a considerable advance over prior known apparatus, in that the useful lifetime of the components of the present invention has been considerably extended.

Naturally, the specific degree of pre-tensioning applied to each of the supporting cable members will depend upon various factors such as the breaking strength of the cable and the types of load and modes of vibration to which the device will be subjected; as an example, in vibrational testing of major aerospace sub-assemblies, which may weigh on the order of several tons, supporting cable members, (each having a breaking strength on the order of 130,000 lbs.), may be utilized, and accordingly, such cables are prestressed to between 13,000 and 65,000 lbs. each. By experimentation, it has been found that the specific preferred value for such prestressing is on the order of 20 percent of the ultimate breaking strength; in the example given above, each such supporting cable member would therefore be stressed to about 26,000 lbs., and would transfer the vibrational forces to the frame, as discussed above, without resonance.

A further advantage of the use of the prestressed supporting cable assemblies is that they provide a safety factor with respect to supporting the moving parts of the apparatus. Specifically, in the event a supporting structural component of the apparatus should fail, the cable members would be capable of supporting the entire weight of the lower table frame means 12, the upper table member 14, and the article being tested, thus substantially reducing the possibility of accidental damage to or even destruction of the article being tested, and/or the apparatus itself. Further, if the amplitude of vibration of the apparatus should increase beyond normal operating ranges, and the vibrational forces increase correspondingly, the supporting cables would take on an increasing proportion of such forces, thus reducing the possibility of excessive loads being applied to the actuators.

Still further, the use of such prestressed supporting cables enables such cables to compensate for differences in thermal expansion in applications where, for example, the lower table frame means 12 and the base frame means 10 are constructed of materials having different coefficients of thermal expansion.

Figures 10, 11:
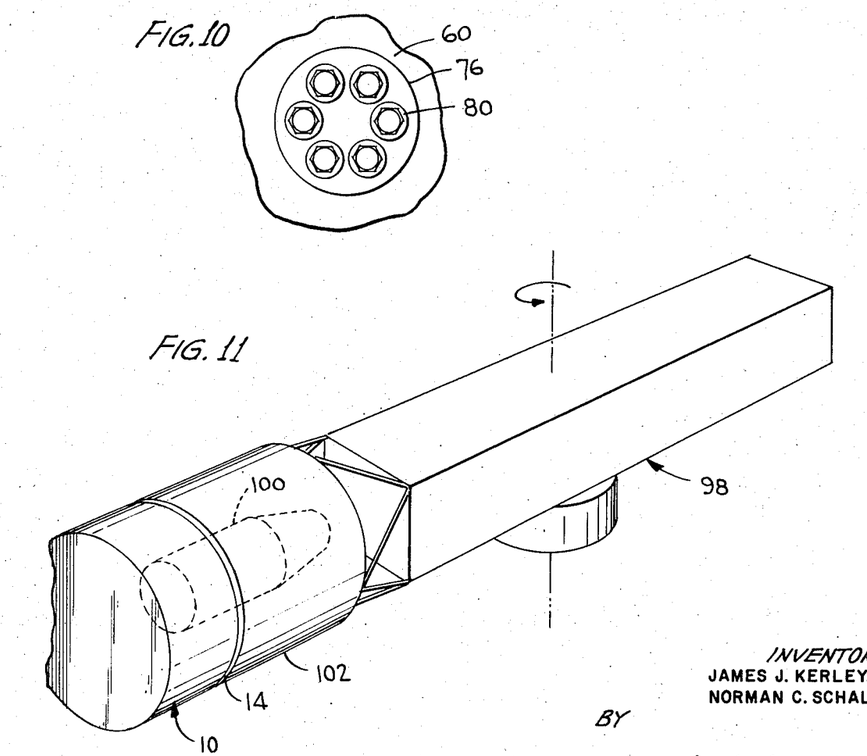
FIG. 10 is a side elevational view, looking along lines 10—10 of FIG. 9, showing the exterior adjustment means for a single cable assembly.
FIG. 11 is a pictorial view showing schematically the manner in which the inventive table may be utilized in connection with a centrifuge.

In FIG. 11, there is illustrated generally schematically the manner in which the vibrational testing apparatus according to the present invention may be utilized in connection with a centrifuge, in order to add accelerational forces to the vibrational forces applied by the apparatus. In FIG. 11, the vibrational testing apparatus according to the invention, comprising base frame 10 and upper table member 14 (the lower table frame means 12 not being shown, but being assembled in the same manner as has been previously described), is mounted upon the free end of a centrifuge, indicated generally by reference numeral 98, which is driven for rotation about an axis in known manner. The vibrational testing apparatus is oriented such that the table means, shown generally towards the top of the apparatus in FIG. 1, is towards the center of the centrifuge, i.e., the rotational axis thereof, and the table means supports thereon, along the radial arm of the centrifuge, the article 100 being tested, which may, for example, comprise a major sub-assembly or component of an aerospace assembly, e.g., a rocket vehicle body or part thereof. A casing or container 102 is provided for the article 100 being tested, and such article is subjected to vibrational forces by the vibrational testing apparatus, in any desired mode of operation thereof, and is additionally subjected to radial accelerational forces due to the rotation of the centrifuge. In this manner, it will be appreciated that numerous types of testing may be carried out through the use of the inventive apparatus.

While the above description of a preferred embodiment is exemplary of the present invention, it should not be considered restrictive or limitative of such invention, the scope of this invention being determined solely by the appended claims.

What is claimed is:

1. Apparatus for vibrational testing of articles, comprising a base frame means; table means disposed within said base frame means and mounted for limited vibratory movement relative thereto, said table means including a table surface adapted to support thereon articles to be tested; actuating means for imparting vibratory movement to said table means in a direction generally perpendicular to said table surface; and prestressed supporting means connecting said table means to said base frame means and supporting substantially the entire weight of said table means, said prestressed supporting means comprising a plurality of supporting cable means symmetrically disposed with respect to said table means, said supporting cable means each being secured at one end thereof to said table means and at the other end thereof to said base frame means, each of said supporting cable means being prestressed to at least about 10 percent of its breaking strength, and all of said supporting cable means being disposed in a plane substantially parallel to said table surface.

2. Apparatus according to claim 1, wherein each of said supporting cable means is prestressed to between about 10 percent and 50 percent of its breaking strength.

3. Apparatus according to claim 1, wherein said table means comprises a lower table frame means and an upper table member supported by said lower table frame means, said upper table member being mounted for transverse vibratory movement relative to said lower table frame means in a plane generally parallel to said table surface, said one end of each of said supporting cable means being secured to said lower table frame means.

4. Apparatus according to claim 3, wherein said actuating means are mounted on said base frame means and are operatively connected to said lower table frame means to impart vibratory movement thereto.

5. Apparatus according to claim 4, wherein said lower table frame means comprises first and second elongated transverse frame members of generally equal length secured to each other at substantially a right angle, at about their respective mid-points, said upper table member resting upon and being supported by said elongated transverse frame members.

6. Apparatus according to claim 5, wherein each of said elongated transverse frame members extends generally parallel to said table surface.

7. Apparatus according to claim 6, wherein each of said elongated transverse frame members comprises a U-beam.

8. Apparatus according to claim 5, wherein said lower table frame means further comprises four elongated connecting frame members, each of said elongated connecting frame members being secured at one end thereof to an end of one of said elongated transverse frame members and at the other end thereof to an end of the other of said elongated transverse frame members.

9. Apparatus according to claim 8, wherein each of said elongated connecting frame members extends generally parallel to said table surface.

10. Apparatus according to claim 8, wherein said lower table frame means has a generally square configuration, said elongated connecting frame members defining respective sides of the square, and said elongated transverse frame members defining diagonals of the square.

11. Apparatus as defined in claim 10, wherein said supporting cable means comprise two pairs of supporting cable assemblies, each of said supporting cable assemblies comprising at least one supporting cable member, a first pair of said supporting cable assemblies being secured at one end thereof to said first elongated transverse frame member respectively at opposite sides thereof, adjacent one end thereof, and being secured at their opposite ends to said base frame member respectively at opposite sides of said first transverse frame member; and the second pair of said supporting cable assemblies being secured at one end thereof to said first elongated transverse frame member respectively at opposite sides thereof, adjacent the other end thereof, and being secured at their opposite ends to said base frame member respectively at opposite sides of said first elongated transverse frame member.

12. Apparatus according to claim 11, wherein each of said supporting cable assemblies extends angularly with respect to the longitudinal direction of said first elongated transverse frame member, said first pair of cable assemblies extending outwardly and toward said one end thereof, and said second pair of cable assemblies extending outwardly and toward said other end thereof.

13. Apparatus as defined in claim 12, wherein each of said supporting cable assemblies is disposed at an angle of about 70° with respect to the longitudinal direction of said first elongated transverse frame member.

14. Apparatus as defined in claim 12, wherein each of said supporting cable assemblies comprises a plurality of supporting cable members, all of the supporting cable members in each of supporting cable assemblies extending generally parallel to each other.

15. Apparatus according to claim 14, wherein each of said supporting cable assemblies comprises four of said supporting cable members.

16. Apparatus as defined in claim 3, wherein said upper table member comprises a comparatively thin and generally planar table member.

17. Apparatus according to claim 16, wherein said upper table member comprises a generally circular disk-like table member.

18. Apparatus according to claim 17, wherein said base frame means comprises a generally cylindrical base frame member surrounding said table means and said actuating means, and having a larger diameter than said upper table member, said generally cylindrical base frame member having a longitudinal axis disposed generally perpendicular to said table surface.

19. Apparatus according to claim 14, wherein each of said pairs of supporting cable assemblies includes a plurality of connecting rod members corresponding in number to the number of supporting cable members in each of said supporting cable assemblies, said connecting rod members extending transversely through said first elongated transverse frame member adjacent said respective ends thereof, the supporting cable members of one of said supporting cable assemblies of each respective pair each being respectively secured to one end of each of said connecting rod members, and the supporting cable members of the other of said supporting cable assemblies of each respective pair each being respectively secured to the other end of each of said connecting rod members.

20. Apparatus as defined in claim 19, further comprising a plurality of anchor block members each associated with one of said supporting cable members, each of said anchor block members being secured to said first elongated transverse frame member, and each of said supporting cable members being threadedly secured at one end thereof to respective ones of said anchor block members.

* * * * *